US005285606A

United States Patent [19]

Hagemeyer

[11] Patent Number: 5,285,606

[45] Date of Patent: Feb. 15, 1994

[54] WINDOW AND DOOR ASSEMBLY MANUFACTURED IN HALF SECTIONS AND METHOD OF INSTALLING SAME

[75] Inventor: Bruce A. Hagemeyer, Pella, Iowa

[73] Assignee: Pella Corporation, Pella, Iowa

[21] Appl. No.: 793,196

[22] Filed: Nov. 18, 1991

[51] Int. Cl.[5] .................... F16B 7/00

[52] U.S. Cl. .................... 52/204.68; 52/204.7; 52/582; 52/585; 52/656.6; 52/656.9; 52/726.1; 52/745.16; 52/745.2; 403/310

[58] Field of Search .................... 52/743, 745.05, 745.09, 52/745.11, 745.13, 745.16, 745.19, 745.2, 207, 208, 204, 585, 582, 584, 475, 656.9, 656.7, 656.5, 656.2, 656.1, 726.1; 49/506, 505, 370; 403/293, 310, 313

[56] References Cited

U.S. PATENT DOCUMENTS

| | | | |
|---|---|---|---|
| 1,202,267 | 10/1916 | Campfield | 52/204 |
| 2,638,190 | 5/1953 | Watkins | 52/207 |
| 2,697,932 | 12/1954 | Goodwin | 52/204 |
| 2,734,602 | 2/1956 | Dawson | 52/204 |
| 2,788,097 | 4/1957 | Frick | 52/207 |
| 2,847,726 | 8/1958 | Frick | 52/207 |
| 3,035,672 | 5/1962 | Tuten et al. | 52/484 X |
| 3,545,133 | 12/1970 | Odend'hal . | |
| 3,981,067 | 9/1976 | Oiler | 52/656.9 X |
| 4,185,430 | 1/1980 | Gartung | 52/582 X |
| 4,616,951 | 10/1986 | Maatela | 52/582 X |
| 4,815,246 | 3/1989 | Haas | 52/207 |
| 4,878,326 | 11/1989 | Sass | 403/313 X |
| 4,949,506 | 8/1990 | Durham | 52/207 |

FOREIGN PATENT DOCUMENTS

| | | | |
|---|---|---|---|
| 3828214 | 2/1990 | Fed. Rep. of Germany . | |
| 2067620 | 7/1981 | United Kingdom | 52/584 |

*Primary Examiner*—Carl D. Friedman
*Assistant Examiner*—Robert J. Canfield
*Attorney, Agent, or Firm*—Zarley, McKee, Thomte, Voorhees & Sease

[57] ABSTRACT

Half window and door sections are fully manufactured at a manufacturing plant and transported to a job site where the half sections are interconnected by a pair of head splice members and a pair of sill splice members. The fully assembled window and door assembly then is installed in the wall opening.

16 Claims, 3 Drawing Sheets

WINDOW AND DOOR ASSEMBLY MANUFACTURED IN HALF SECTIONS AND METHOD OF INSTALLING SAME

BACKGROUND OF THE INVENTION

Ideally, a window and door system would be totally manufactured as a unitary system and put in place in the wall opening on the job site. The problem is that the size of window and door systems is such that it is not manageable to ship an entire assembled window and door system to a job site for installation. Accordingly, the typical window and door system will be manufactured in component parts which then will be assembled on the job site. This approach has the potential of assembly problems occurring which may result in a defective window and door system. What is desirable, then, is a window and door system that can be manufactured as fully as possible but yet be of such a size that it can be readily shipped to the job site and then installed on a basis that there is a minimal opportunity for mistakes to be made which will cause the system to be inoperative.

SUMMARY OF THE INVENTION

Factory manufactured and assembled window and door assembly half sections are shipped to the job site and put in place by simply interconnecting the half sections by a pair of head and sill splice members. The system is nearly foolproof in terms of errors occurring during installation at the job site. Both the head and sill members include a pair of channels into which a pair of splice members can be placed only one way for locking the half sections together as a unitary window and door assembly.

DESCRIPTION OF THE PREFERRED EMBODIMENT

Figure 1:
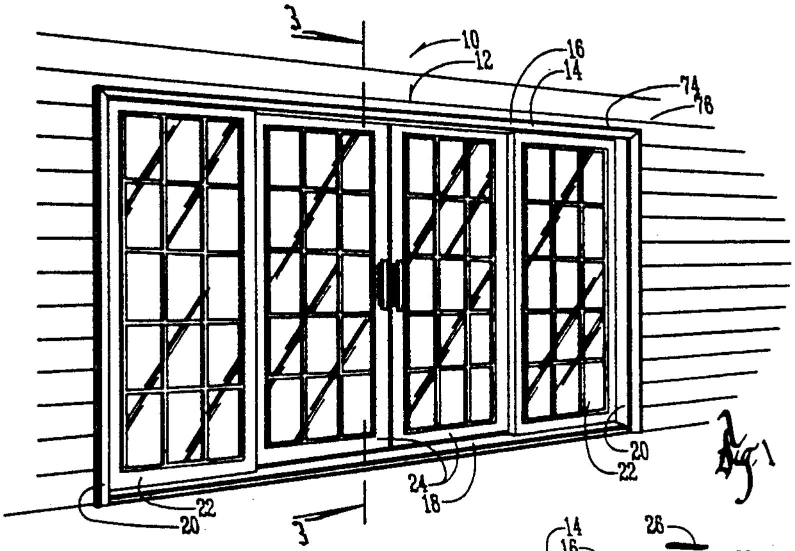
FIG. 1 is a fragmentary perspective view of a building wall including an installed window and door assembly which has been manufactured in half sections and interconnected at the job site.
Figure 2:
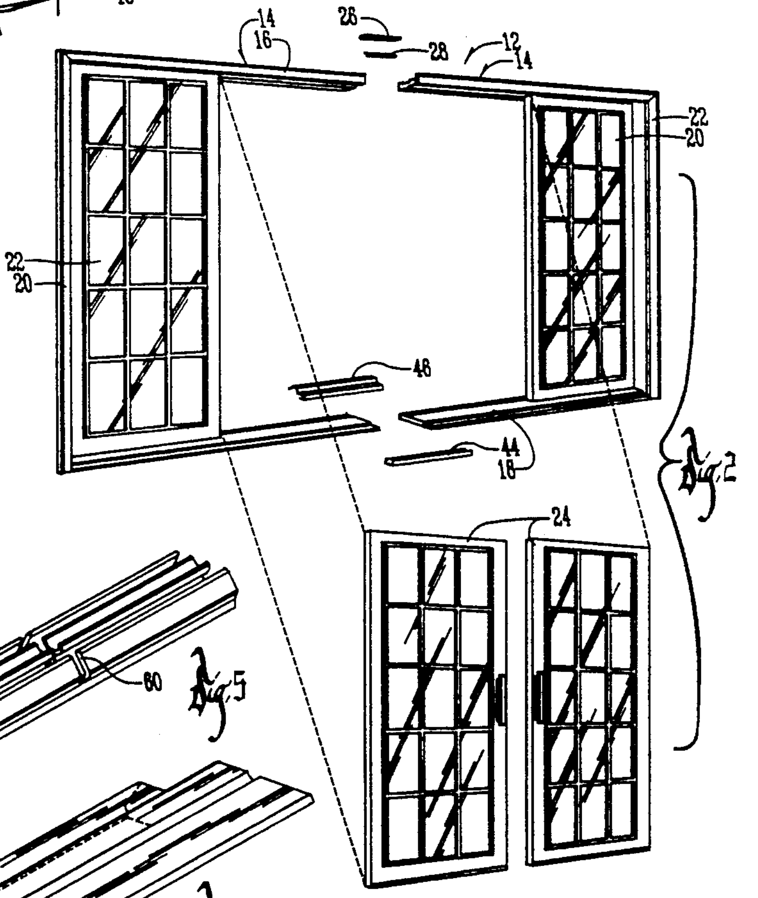
FIG. 2 is an exploded perspective view of the window and door assembly.

The window and door assembly of this invention is referred to generally in FIG. 1 by the reference numeral 10 and includes a pair of window and door half sections 12 and 14 as seen in FIG. 2.

Each window and door half section 12 and 14 includes head members 16 and sill members 18. The outer vertical frame members 20 interconnect the head and sill members 16 and 18. By the way of illustration, the half sections 12 and 14 include fixed window units 22 and sliding door window units 24. The head and sill frame members 16 and 18 function as tracks for the sliding doors 24.

Figure 3:
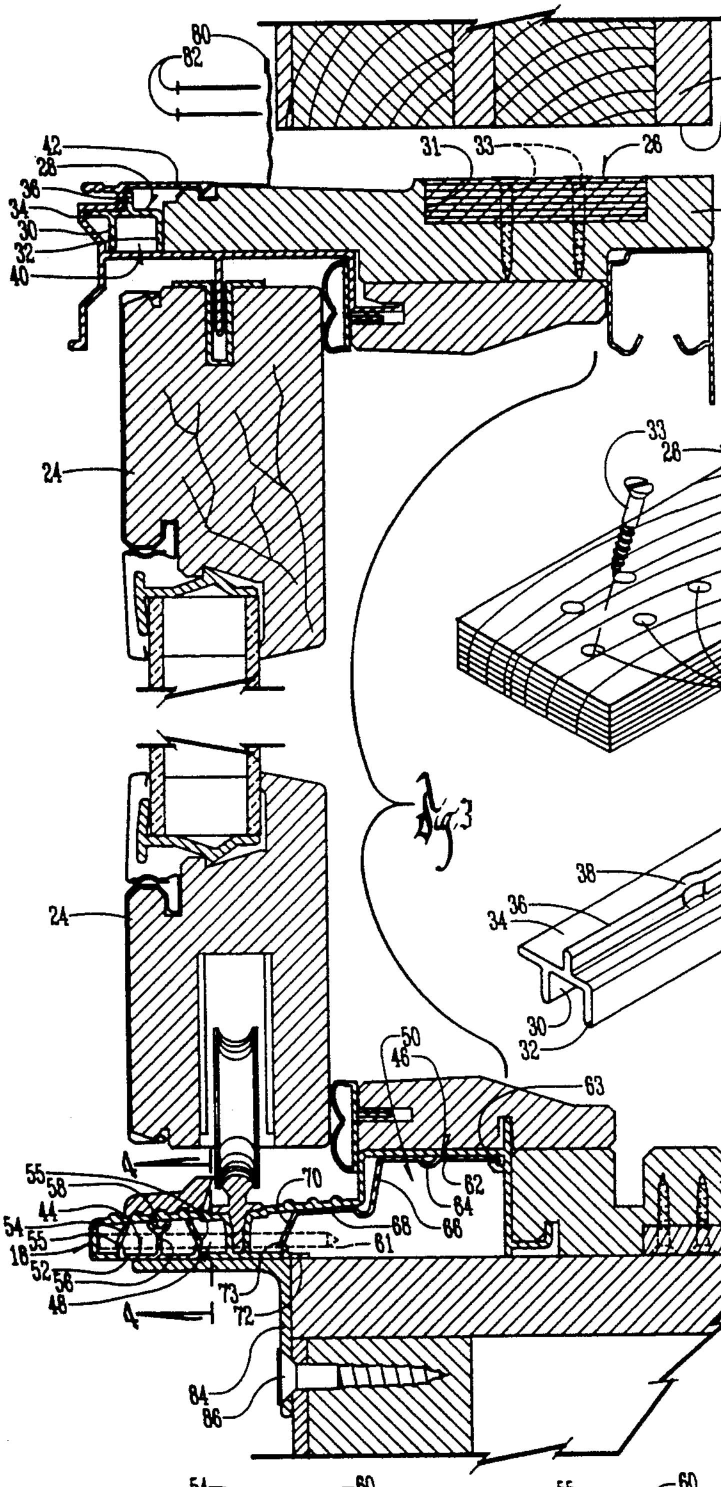
FIG. 3 is a cross sectional view taken along line 3—3 in FIG. 1.
Figure 7:
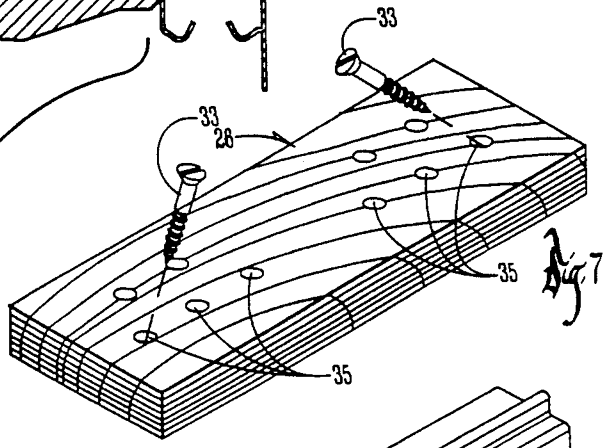
FIG. 7 is a perspective view of an inner head splice member.
Figure 8:
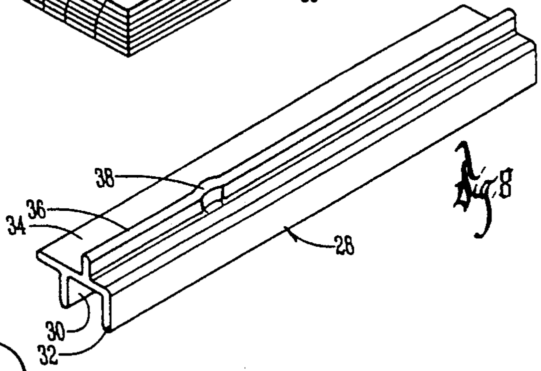
FIG. 8 is a perspective view of an outer head splice member.

The head members 16 are interconnected by an inner wood splice member 26 and an outer metal splice member 28 as seen in FIGS. 7 and 8. A channel 31 is formed in the head frame member 16 to receive the inner wood splice member 26 as seen in FIG. 3. The wood splice member 26 is laminated and includes a plurality of screws 33 received in holes 35 disposed at an angle such that the screws 33 are directed downwardly and outwardly toward the opposite ends for drawing the head members 16 together in end to end abutting relationship.

The outer head splice member 28 is of metal and includes downwardly extending longitudinally spaced apart legs 30 and 32 interconnected by a horizontally extending wall 34 having an upwardly extending leg 36. A small deformation 38 is formed in the upstanding leg 36. In FIG. 3 it is seen that a channel 40 is provided in metal framing 42 on the head frame member 16. The shape of the splice member 28 is complimentary to the shape of the channel 40 thus providing a solid and firm unitary head member for the window and door assembly when assembled. The splice member 28 is driven into the channel 40 of one of the half sections 12 or 14 and is substantially held against unintended longitudinal movement by the deformation 38 which frictionally holds the splice member 28 in place. The other channel 40 can be slid over the exposed end of the splice member 28 smoothly as it does not contain any deformation.

Figure 5:
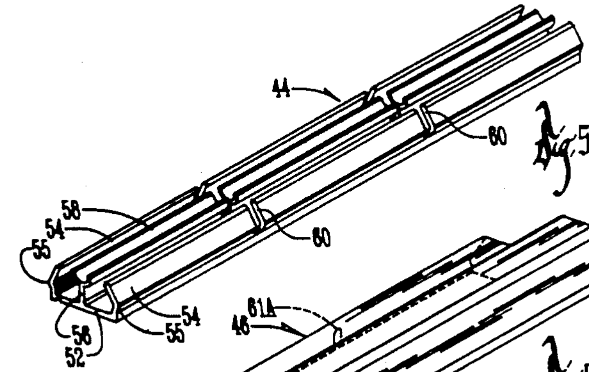
FIG. 5 is a perspective view of an outer sill splice member.
Figure 6:
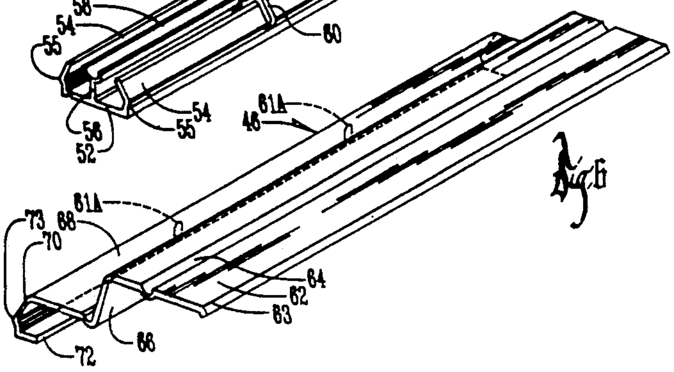
FIG. 6 is a perspective view of an inner sill splice member.

The sill members 18 are interconnected by an outer sill splice member 44 and an inner sill splice member 46 as seen in FIGS. 5 and 6. The outer sill splice member 44 is received in a channel 48 formed in the metal sill 18 while the inner sill splice member 46 is received in a channel 50. Both splice members 44 and 46 are made of metal and have shapes that compliment the shape of the channels 48 and 50.

It is seen in FIG. 5 that the outer sill splice member 44 has a base wall 52 with longitudinally extending upstanding outer walls 54 which include longitudinal shoulders 55. A center wall 56 is in spaced apart relationship to walls 54. The wall 56 terminates at its upper end in an upwardly facing concave element 58. Laterally extending slots 60 are provided to receive screws 61 as seen in FIG. 3 that interconnect the outer sill splice member 44 with the inner sill splice member 46 through slots 61A. The inner sill splice member 46 includes an upper horizontal wall 62 having a downwardly turned edge 63 and a longitudinally extending groove 64 and a downwardly extending wall 66 which terminates in a horizontally extending wall portion 68 which in turn terminates in a downwardly extending wall portion 70 having a return bend portion 72. The wall 70 includes a longitudinal shoulder 73.

It is thus seen in operation that the half window and door sections 12 and 14 would be fully assembled at the manufacturing site remote to the installation site where the half sections are assembled as window assembly 10 which is then mounted in a wall opening 74 of a house wall 76. The half sections 12 and 14 would be packaged separately and transported to the job site. At the job site the head splice members 26 and 28 are inserted into their channels 31 and 40 and the screws 33 are installed. It is seen that the inner wood head splice member 26 may be dropped into the channels 31 while the outer metal head splice member 28 is slid longitudinally into the open ends of the channels 40.

Figure 4:
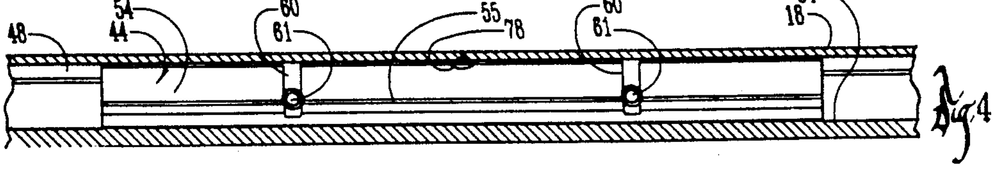
FIG. 4 is a cross sectional view taken along line 4—4 in FIG. 3.
Figure 9:
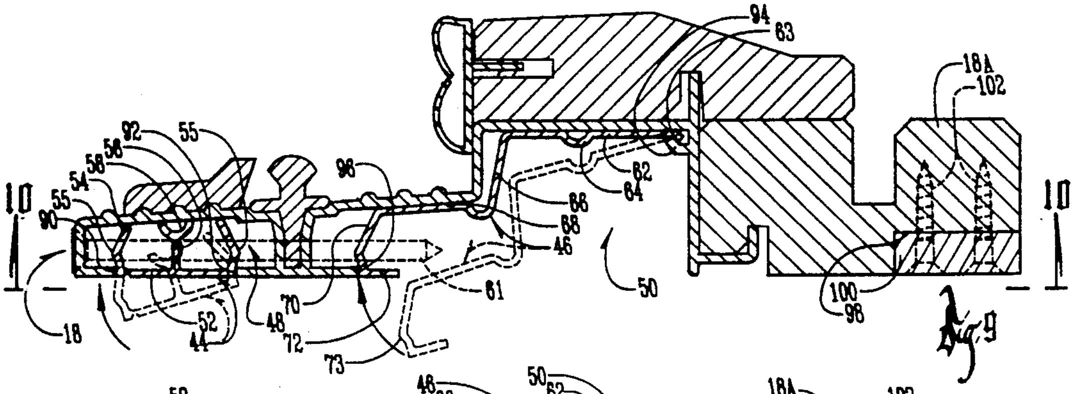
FIG. 9 is an enlarged cross sectional view similar to FIG. 3 but showing only the inner and outer sill splice members being installed.
Figure 10:
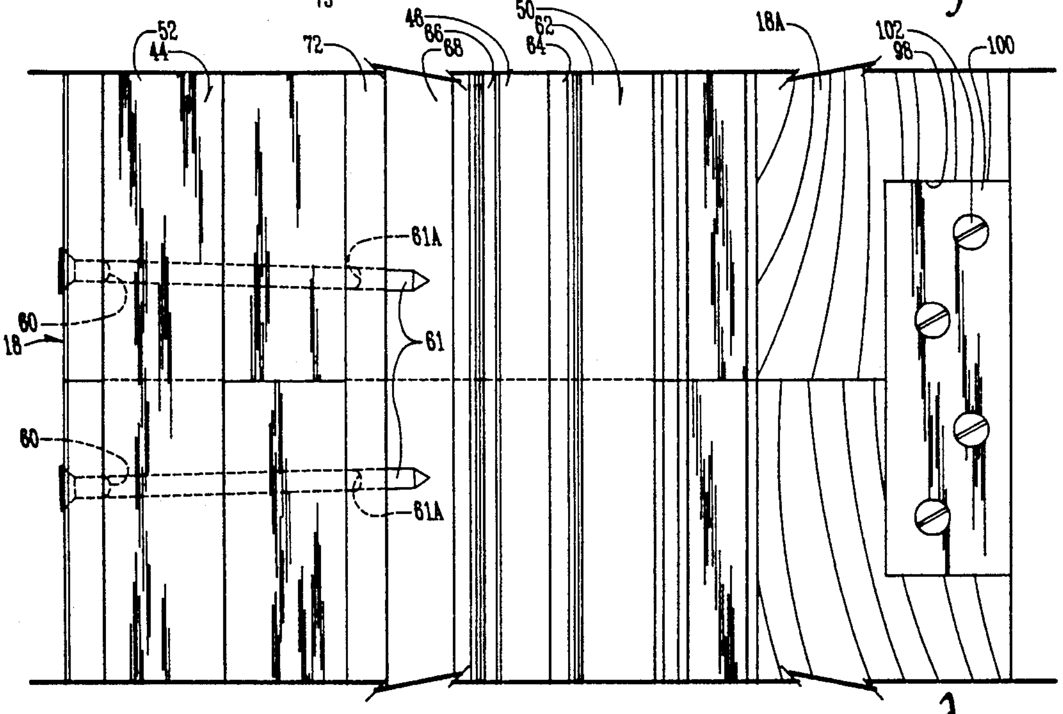
FIG. 10 is a cross sectional view taken along line 10—10 in FIG. 9.
Figure 11:
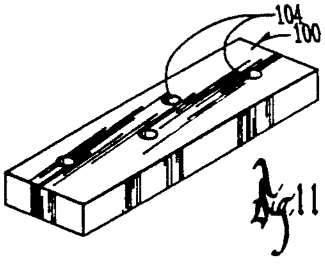
FIG. 11 is a perspective view of the metal plate interconnecting wood sill members.

The abutting ends of the sill frame members 18 are interlocked by pivoting the splice members 44 and 46 into their respective channels 48 and 50 as seen in FIG. 9. It is seen that the sill 18 includes spaced apart edge portions 90 and 92 forming an opening into channel 48 to receive the outer sill splice member 44. The shoulder 55 on one leg 54 is inserted into the channel 48 between the edges 90 and 92 and the opposite side of the splice member 44 is then pivoted upwardly with the other leg 54 being deflected towards the first leg 54 until it passes the edge 90 where the splice member 44 is then locked in the channel 48. In the case of the inner sill splice member 46 the longitudinal edge 63 is inserted into a slot formed by a flange 94 followed by the opposite end being pivoted upwardly such that the longitudinal shoulders 73 passes an edge 96 on the sill 18 which springs the wall portion 70 away until the splice member 46 is locked in place in the channel 50. The screws 61 are then inserted into the sill 18 and the slot 60 of the outer sill splice member 44 and the slot 61A of the inner splice member 46 thereby locking the sill frame members 18 together. It is seen that the slots 61A in the inner splice member 46 in FIG. 10 are spaced closer together than the slots 60 in the outer splice member 44 and openings in the sill 18 such that the screws 61 are angled towards each other thereby drawing the metal sills 18 towards each other in abutting engagement. The sills 18 include inner edges 18A as seen in FIG. 10 having slots 98 formed therein which receive a metal splice member 100 held in place by screws 102 which extend through holes 104. The holes are angled so that the screws 102 will draw the sills 18 together. As seen in FIG. 4, silicone 78 is applied to the end edges of the abutting sill frame members 18. The window and door assembly now being fully assembled may be placed in the wall opening 74 in the wall 76 and anchored in place by mounting flanges 80 being fastened to the wall 76 by nails 82 as seen in FIG. 3. The sill frame members 18 include an L-shaped ledge 84 attached to the wall 76 by screws 86.

It is thus seen that a door and window assembly may be substantially fully manufactured at the factory except for the step of installing the head and sill splice members which step is performed at the job site. Thus the installation of the window and door assembly 10 in the wall opening 74 is substantially foolproof since there is only one way in which the window and door half sections can be interconnected. Once the splice member channels are aligned and the splice members inserted into the channels, the head and sill frame members must be in abutting relationship and the window and door unit becomes a fully operational system.

I claim:

1. A window and door assembly comprising, a pair of window and door half sections, each half section including head and sill members interconnected by an outer vertical frame member and having an inner vertical edge head splice means interconnecting said head members and sill splice means interconnecting said sill members thereby forming a unitary window and door assembly having spliced together sill and head members adapted to be mounted in a wall opening.

said head members including aligned head channels and said head splice means including a head splice member received in said head channels, and said head splice member received in said aligned head channels being further defined as including fasteners in opposite ends of said head splice member extending downwardly and outwardly towards the adjacent end of said head splice member and into holding engagement with said head members to draw and hold said half sections together as an integral unitary window and door assembly.

2. The structure of claim 1 wherein said head members and said splice member are made of wood.

3. The structure of claim 2 wherein said head members include inner and outer aligned head channels and said splice means include inner and outer head splice members received in said inner and outer head channels and said splice member made of wood is said inner splice member.

4. The structure of claim 3 wherein said outer splice head member in said outer aligned channels is made of metal.

5. The structure of claim wherein said outer head splice member is slid into said outer aligned head channels.

6. The structure of claim 5 wherein cooperating locking means are provided on one of said outer aligned head channels and one end of said outer head splice member.

7. The structure of claim 6 wherein the other of said outer aligned head channels and an end opposite said one end of said outer head splice member are adapted to freely move longitudinally relative to each other during assembly.

8. A window and door assembly comprising, a pair of window and door half sections, each half section including head and sill members interconnected by ah outer vertical frame member and having an inner vertical edge, head splice means interconnecting said head members and still splice means interconnecting said sill members thereby forming a unitary window and door assembly having spliced together sill and head members adapted to be mounted in a wall opening, said sill members including inner and outer aligned sill channels and said sill splice means including inner and outer sill splice members received in said inner and outer sill channels, and said inner and outer sill splice members being interconnected by horizontally extending fastening means extending through said sill members and through said outer sill splice members into said inner sill splice member.

9. The structure of claim 8 wherein said horizontally extending fastening means are angled towards each other at their inner ends connected to said inner sill splice member to draw said sill members together.

10. The structure of claim 9 wherein said sill members, outer splice member and inner splice member have openings to receive said fastening means, and said openings in said inner splice member are spaced closer together than the openings in said sill members and said outer splice member.

11. The method of manufacturing and installing a window and door assembly comprising the steps of.

manufacturing window and door half sections including head and sill members, transporting a pair of window and door half sections to the job site where a wall opening for a window and door assembly has been provided, assembling the pair of window and door half sections by interconnecting the head and sill members with head and sill splice members to form a unitary fully assembled window and door assembly, and installing the assembled window and door assembly in the wall opening.

12. The method of claim 11 wherein the assembly of the window and door half sections includes installing a pair of inner and outer head splice members in inner and outer aligned channels in the head members and installing a pair of inner and outer sill splice members in inner and outer aligned channels in the sill embers.

13. The method of claim 12 wherein the step of installing the outer head splice member further includes the step of sliding said outer head splice member into said outer head channels.

14. The method of claim 12 wherein the step of installing the inner and outer sill splice members includes the step of pivoting the sill splice members into said inner and outer sill channels.

15. A window and door assembly comprising:

a pair of window and door half sections, each half section including head and sill members interconnected by an outer vertical frame member and having an inner vertical edge, head splice means interconnecting said head members and sill splice means interconnecting said sill member thereby forming a unitary window and door assembly having spliced together sill and head members adapted to be mounted in a wall opening, said sill members including inner and outer aligned sill channels and said sill splice means including inner and outer sill splice members received in said inner and outer sill channels, and said inner and outer sill splice members being pivoted into said inner and outer channels and being yieldably locked in place by lock means on said inner and outer channels.

16. The method of manufacturing and installing a window and door assembly comprising the steps of, manufacturing window and door half sections including head and sill members.

transporting a pair of window and door half sections to the job site where a wall opening for a window and door assembly has been provided, assembling the pair of window and door half sections by interconnecting the head and sill members with head and sill splice members to form a unitary fully assembled window and door assembly, and said assembly of the window and door half sections including installing a pair of inner and outer head splice members in inner and outer aligned channels in the head frame members and installing a pair of inner and outer sill splice members in inner and outer aligned channels of the sill frame members, and said installing the inner and outer sill splice members including the step of pivoting the sill splice members into said inner and outer sill channels, and installing the assembled window and door assembly in the wall opening.

* * * * *